(12) United States Patent
Zeng et al.

(10) Patent No.: US 9,225,578 B2
(45) Date of Patent: Dec. 29, 2015

(54) HIGH ORDER MODULATION METHOD, DEMAPPING METHOD, AND CORRESPONDING DEVICE

(71) Applicant: Huawei Technologies Co., Ltd., Shenzhen (CN)

(72) Inventors: Yanxing Zeng, Shenzhen (CN); Guangjian Wang, Shenzhen (CN); Kunpeng Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/577,734

(22) Filed: Dec. 19, 2014

(65) Prior Publication Data

US 2015/0103956 A1     Apr. 16, 2015

Related U.S. Application Data

(63) Continuation of application No. PCT/CN2013/071753, filed on Feb. 22, 2013.

(30) Foreign Application Priority Data

Jun. 27, 2012  (CN) .......................... 2012 1 0214774

(51) Int. Cl.
*H04L 27/36* (2006.01)
*H04L 27/34* (2006.01)
*H04L 1/00* (2006.01)
*H04L 27/38* (2006.01)

(52) U.S. Cl.
CPC .............. *H04L 27/365* (2013.01); *H04L 1/007* (2013.01); *H04L 1/0086* (2013.01); *H04L 27/3488* (2013.01); *H04L 27/38* (2013.01)

(58) Field of Classification Search
CPC ..... H04L 27/34; H04L 27/362; H04L 27/365; H04L 1/0071
USPC .............. 375/298, 261, 347; 455/67.11, 115.1
See application file for complete search history.

(56) References Cited

U.S. PATENT DOCUMENTS

| | | | |
|---|---|---|---|
| 6,118,826 A | | 9/2000 | Zehavi et al. |
| 2007/0243837 A1* | | 10/2007 | Krishnamoorthi et al. .......................... 455/115.1 |
| 2009/0016359 A1 | | 1/2009 | Niu et al. |
| 2009/0102852 A1 | | 4/2009 | Eyvazkhani |
| 2009/0129484 A1 | | 5/2009 | He et al. |
| 2013/0148980 A1* | | 6/2013 | Drost et al. ................... 398/172 |
| 2013/0343494 A1* | | 12/2013 | Bolinth et al. ................ 375/341 |
| 2015/0078486 A1* | | 3/2015 | Wang et al. ................... 375/298 |

FOREIGN PATENT DOCUMENTS

| | | |
|---|---|---|
| CN | 101087281 A | 12/2007 |
| CN | 101404642 A | 4/2009 |
| CN | 101518002 A | 8/2009 |
| CN | 101895511 A | 11/2010 |
| CN | 101958875 A | 1/2011 |

\* cited by examiner

*Primary Examiner* — Khai Tran
(74) *Attorney, Agent, or Firm* — Brinks Gilson & Lione

(57) ABSTRACT

A high order modulation method, a demapping method, and a corresponding device are provided. With the high order modulation method, important bits is distinguished, and the important bits are divided into important bits for distinguishing large regions and important bits for distinguishing small regions according to the difficulty of judgment areas. Therefore, the judgment accuracy rate of a demodulator is further improved.

10 Claims, 11 Drawing Sheets

| 0 | 8 | 24 | 16 | 48 | 56 | 40 | 32 |
|---|---|----|----|----|----|----|----|
| 1 | 9 | 25 | 17 | 49 | 57 | 41 | 33 |
| 3 | 11 | 27 | 19 | 51 | 59 | 43 | 35 |
| 2 | 10 | 26 | 18 | 50 | 58 | 42 | 34 |
| 6 | 14 | 30 | 22 | 54 | 62 | 46 | 38 |
| 7 | 15 | 31 | 23 | 55 | 63 | 47 | 39 |
| 5 | 13 | 29 | 21 | 53 | 61 | 45 | 37 |
| 4 | 12 | 28 | 20 | 52 | 60 | 44 | 36 |

Figure 6

| Ai | Bi | Di | Ci |
|----|----|----|----|
| Ei | Fi | Hi | Gi |
| Mi | Ni | Pi | Oi |
| Ii | Ji | Li | Ki |

Figure 7

| | | | | | | | | | | | | |
|---|---|---|---|---|---|---|---|---|---|---|---|---|
| | | | 117 | 116 | 113 | 115 | 83 | 81 | 84 | 85 | | |
| | | | 121 | 120 | 112 | 114 | 82 | 80 | 88 | 89 | | |
| | 118 | 122 | 58 | 56 | 48 | 50 | 18 | 16 | 24 | 26 | 90 | 86 |
| | 119 | 123 | 59 | 57 | 49 | 51 | 19 | 17 | 25 | 27 | 91 | 87 |
| | 125 | 127 | 63 | 61 | 53 | 55 | 23 | 21 | 29 | 31 | 95 | 93 |
| | 124 | 126 | 62 | 60 | 52 | 54 | 22 | 20 | 28 | 30 | 94 | 92 |
| | 108 | 110 | 46 | 44 | 36 | 38 | 6 | 4 | 12 | 14 | 78 | 76 |
| | 109 | 111 | 47 | 45 | 37 | 39 | 7 | 5 | 13 | 15 | 79 | 77 |
| | 103 | 107 | 43 | 41 | 33 | 35 | 3 | 1 | 9 | 11 | 75 | 71 |
| | 102 | 106 | 42 | 40 | 32 | 34 | 2 | 0 | 8 | 10 | 74 | 70 |
| | | | 105 | 104 | 96 | 98 | 66 | 64 | 72 | 73 | | |
| | | | 101 | 100 | 97 | 99 | 67 | 65 | 68 | 69 | | |

Figure 8

| 128 | 129 | 131 | 130 | 134 | 135 | 133 | 132 | 140 | 141 | 143 | 142 | 138 | 139 | 137 | 136 |
|-----|-----|-----|-----|-----|-----|-----|-----|-----|-----|-----|-----|-----|-----|-----|-----|
| 144 | 145 | 147 | 146 | 150 | 151 | 149 | 148 | 156 | 157 | 159 | 158 | 154 | 155 | 153 | 152 |
| 176 | 177 | 179 | 178 | 182 | 183 | 181 | 180 | 188 | 189 | 191 | 190 | 186 | 187 | 185 | 184 |
| 160 | 161 | 163 | 162 | 166 | 167 | 165 | 164 | 172 | 173 | 175 | 174 | 170 | 171 | 169 | 168 |
| 224 | 225 | 227 | 226 | 230 | 231 | 229 | 228 | 236 | 237 | 239 | 238 | 234 | 235 | 233 | 232 |
| 240 | 241 | 243 | 242 | 246 | 247 | 245 | 244 | 252 | 253 | 255 | 254 | 250 | 251 | 249 | 248 |
| 208 | 209 | 211 | 210 | 214 | 215 | 213 | 212 | 220 | 221 | 223 | 222 | 218 | 219 | 217 | 216 |
| 192 | 193 | 195 | 194 | 198 | 199 | 197 | 196 | 204 | 205 | 207 | 206 | 202 | 203 | 201 | 200 |
| 64  | 65  | 67  | 66  | 70  | 71  | 69  | 68  | 76  | 77  | 79  | 78  | 74  | 75  | 73  | 72  |
| 80  | 81  | 83  | 82  | 86  | 87  | 85  | 84  | 92  | 93  | 95  | 94  | 90  | 91  | 89  | 88  |
| 112 | 113 | 115 | 114 | 118 | 119 | 117 | 116 | 124 | 125 | 127 | 126 | 122 | 123 | 121 | 120 |
| 96  | 97  | 99  | 98  | 102 | 103 | 101 | 100 | 108 | 109 | 111 | 110 | 106 | 107 | 105 | 104 |
| 32  | 33  | 35  | 34  | 38  | 39  | 37  | 36  | 44  | 45  | 47  | 46  | 42  | 43  | 41  | 40  |
| 48  | 49  | 51  | 50  | 54  | 55  | 53  | 52  | 60  | 61  | 63  | 62  | 58  | 59  | 57  | 56  |
| 16  | 17  | 19  | 18  | 22  | 23  | 21  | 20  | 28  | 29  | 31  | 30  | 26  | 27  | 25  | 24  |
| 0   | 1   | 3   | 2   | 6   | 7   | 5   | 4   | 12  | 13  | 15  | 14  | 10  | 11  | 9   | 8   |

Figure 9

|    |    |    |    |    |    |    |    |
|----|----|----|----|----|----|----|----|
| A0 | B0 | D0 | C0 | A1 | B1 | D1 | C1 |
| E0 | F0 | H0 | G0 | E1 | F1 | H1 | G1 |
| M0 | N0 | P0 | O0 | M1 | N1 | P1 | O1 |
| I0 | J0 | L0 | K0 | I1 | J1 | L1 | K1 |
| A2 | B2 | D2 | C2 | A3 | B3 | D3 | C3 |
| E2 | F2 | H2 | G2 | E3 | F3 | H3 | G3 |
| M2 | N2 | P2 | O2 | M3 | N3 | P3 | O3 |
| I2 | J2 | L2 | K2 | I3 | J3 | L3 | K3 |

HIGH ORDER MODULATION METHOD, DEMAPPING METHOD, AND CORRESPONDING DEVICE

CROSS-REFERENCE TO RELATED APPLICATIONS

This application is a continuation of International Application No. PCT/CN2013/071753, filed on Feb. 22, 2013, which claims priority to Chinese Patent Application No. 201210214774.5, filed on Jun. 27, 2012, both of which are hereby incorporated by reference in their entireties.

FIELD

The application relates to communication technology field, in particular to a high order modulation method and device, a demapping method and device.

BACKGROUND

With an increasing requirement for transmission speed and spectral efficiency, communication system may satisfy the requirement for transmission speed and spectral efficiency in a higher order quadrature amplitude modulation (QAM) mode. An important subject faced by industry is that a method for effectively mapping bit information to be transmitted to high order modulation constellation points, so as to ensure spectrum efficiency and satisfy basic requirement of the system for bit error rate (or frame error rate).

In academia, a solution of multilayer coding modulation is provided for this subject. In the solution, transmitted bit streams are demultiplexed and divided into parallel sub information streams; a channel encoding is performed on each of sub information streams; and uniform symbol mapping is perform on bit data in each coded channel to generate a symbol data stream. Based on the solution, in view of realizability and an improvement of frequency efficiency, lots of engineering feasible solutions are provided in the industry. For example, after transmitted bit data is demultiplexed, the channel encoding is performed on only one of parallel channels of bit data, which will not be performed on the other channel of bit data.

In conventional technology, when encoded bit data and uncoded bit data are allocated, information such as a mapping order of high order modulation constellation points, a code rate of channel encoding and a predefined mapping manner, etc., is comprehensively considered to divide the two channels of bit data into important bit data and unimportant bit data. The important bit data is configured to divide constellation points into disjoint subsets of constellation points, called coset, and thus the channel encoding is not performed on the important bit data. However, the channel encoding is performed on the unimportant bit data, and high order modulation constellation points corresponding to the encoded bit data are selected from the coset in the predefined mapping manner.

In foregoing conventional technology, in one aspect, amount of important bits and amount of unimportant bits may be allocated according to practical application scenarios to implement different frequency efficiency. In another aspect, combined with characteristics of a constellation diagram, although the complex channel encoding may not be performed, important bits may reach the same code error rate/frame error rate as those coded with channel encoding, thus reducing implementation complexity. Therefore, in conventional technology, a compromise design is implemented to some extent in view of frequency efficiency and implementation complexity. However, when a high order modulation is demodulated in an existing mapping mode, important bits is only decided based on least Euclidean distance criteria, thereby causing poor decision accuracy for symbol data.

SUMMARY

A high order modulation method, a demapping method and devices thereof are provided according to the embodiments of the application, thus conquering an existing shortcoming that decision accuracy of symbol data is poor in a process of demodulating high order modulation.

A high order modulation method is provided according to an embodiment of the application. The method includes:
converting information to be transmitted into bit data, and demultiplexing the bit data into more than one channel of bit data;
performing quadrature amplitude modulation on the more than one channel of bit data to generate symbol data, and outputting the generated symbol data,
where an order of the quadrature amplitude modulation is not less than 64, and where the quadrature amplitude modulation includes mapping the bit data to the symbol data, and the mapping the bit data to the symbol data includes dividing the bit data into three parts,
a first part of the bit data is configured to be mapped to constellation points and divide the constellation points into disjoint subsets of constellation points, and the subsets are defined as large regions,
a second part of the bit data is configured to be mapped to the constellation points and divide subsets of constellation points in each large region into disjoint subsets, and the disjoint subsets in each large region are defined as small regions, and
a third part of the bit data is configured to be mapped to corresponding constellation points in the small regions.

A demapping method is also provided according to an embodiment of the application. The method includes:
performing a demodulation decision on an input symbol, and acquiring decision subsets;
determining a large region where the input symbol locates, where the large region divides constellation points into disjoint subsets of constellation points; and
determining bit data mapped by the input symbol, according to minimum distance demodulation criterion, the acquired decision subsets and the determined large region where the input symbol locates.

A high order modulation device is also provided according to an embodiment of the application. The device includes: a demultiplexing unit and a quadrature amplitude modulation unit;
the de-multiplexing unit is configured to convert information to be transmitted into bit data and demultiplex the bit data into more than one channel of bit data;
the quadrature amplitude modulation unit is configured to perform quadrature amplitude modulation on the more than one channel of bit data to generate symbol data, and output the generated symbol data,
where an order of the quadrature amplitude modulation is not less than 64 and where the quadrature amplitude modulation includes mapping the bit data to the symbol data, and the mapping the bit data to the symbol data includes dividing the bit data into three parts, a first part of the bit data is configured to be mapped to constellation points and divide the constellation points into disjoint subsets of constellation points, and the subsets are defined as large regions, a second part of the bit data is configured to be mapped to the constellation points and divide subsets of the constellation points in each large region into disjoint subsets, and the disjoint subsets in each large region are defined as small regions, and a third part of the bit data is configured to be mapped to corresponding constellation points in the small regions.

A demapping device is also provided according to an embodiment of the application. The device includes: an acquiring unit, a large region determining unit and a decision unit.

The acquiring unit is configured to perform demodulation decision on an input symbol, and acquire decision subsets.

The large region determining unit is configured to determine a large region where the input symbol locates, where the large region divides constellation points into disjoint subsets of constellation points.

The decision unit is configured to determine bit data mapped by the input symbol, according to minimum distance demodulation criterion, the acquired decision subsets and the determined larger region where the input symbol locates.

Based on the technical solution according to the embodiments of the application, important bits are distinguished, according to difficult degrees of decision areas, which is divided into important bits for distinguishing large regions and important bits for distinguishing small regions. Therefore, decision accuracy of a demodulator may be further improved.

BRIEF DESCRIPTION OF THE DRAWINGS

To describe the technical solutions for the embodiment of the present application or technical solution in conventional technology more clearly, the following briefly describes the drawings involved in the embodiments of the present application or in the conventional technology. Apparently, the drawings described below are some embodiments, and persons of ordinary skill in the art can derive other drawings according to the drawings without any creative effort.

FIG. 2 is a schematic diagram of a 64QAM constellation mapping according to an embodiment of the application;

FIG. 3 is a schematic diagram of a 128QAM constellation mapping according to an embodiment of the application;

FIG. 4 is a schematic diagram of a 256QAM constellation mapping according to an embodiment of the application;

FIG. 5 is a schematic diagram of a 512QAM constellation mapping according to an embodiment of the application;

FIG. 6 is a schematic diagram of a 1024QAM constellation mapping according to an embodiment of the application (in which certain constellation points of small regions are not shown);

FIG. 7 is a schematic diagram of constellation points corresponding to a small region;

FIG. 8 is a schematic diagram of a 2048QAM constellation mapping according to an embodiment of the application (in which certain constellation points of small regions are not shown);

FIG. 9 is a schematic diagram of a 4096QAM constellation mapping according to an embodiment of the application (in which certain constellation points of small regions are not shown);

DETAILED DESCRIPTION

First Embodiment

Figure 1:
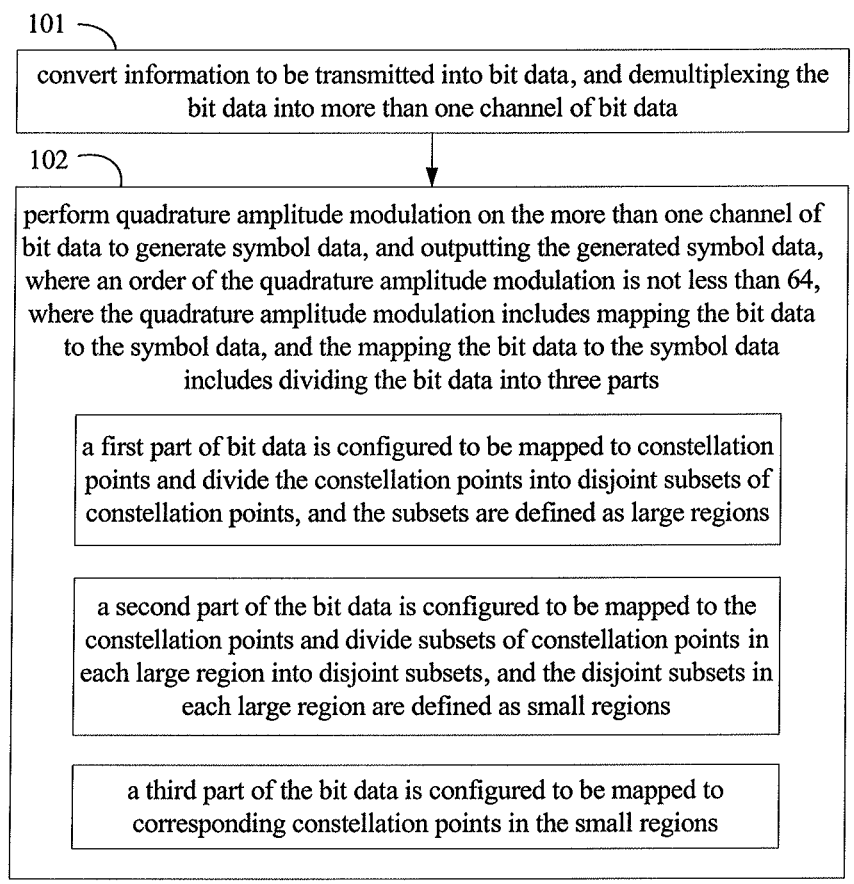
FIG. 1 is a schematic flow chart of a high order modulation method according to an first embodiment of the application.

A high order modulation method is provided according to an embodiment of the application. As shown in FIG. 1, the method includes following steps.

Step 101 includes: converting information to be transmitted into bit data, and demultiplexing the bit data into more than one channel of bit data.

Step 102 includes: performing quadrature amplitude modulation on the more than one channel of bit data to generate symbol data, and outputting the generated symbol data.

An order of the quadrature amplitude modulation is not less than 64. The performing the quadrature amplitude modulation includes mapping the bit data to the symbol data, and the mapping the bit data to the symbol data includes dividing the bit data into three parts.

A first part of bit data is configured to be mapped to constellation points and divide the constellation points into disjoint subsets of constellation points, and the subsets are defined as large regions.

A second part of the bit data is configured to be mapped to the constellation points and divide subsets of constellation points in each large region into disjoint subsets, and the disjoint subsets in each large region are defined as small regions.

A third part of the bit data is configured to be mapped to corresponding constellation points in the small regions.

It is noted that a first part of bit data is configured to be mapped to constellation points and divide the constellation points into disjoint subsets of constellation points, and the subsets are defined as large regions in the step 102 may be considered that a part of the bit data is configured to divide, according to difficult degrees of decision areas, mapped constellation points into disjoint subsets of the constellation points, and the subsets are called large regions.

It is noted that the difficult degree of decision area may be determined from power of a symbol represented by a constellation point. The higher the power is, the easier the decision is, because the decision accuracy is improved with an increasing signal-to-noise ratio. In a conventional technology, important bits may not be distinguished and the decision is performed only in the least Euclidean distance criteria. However, in the technical solutions of the application, a decision area is narrowed firstly according to the important bits for distinguishing the larger region, and the decision is performed on the narrowed signal region (signal subsets) according to the least Euclidean distance criteria, so as to improve decision accuracy.

Figures 2, 3:
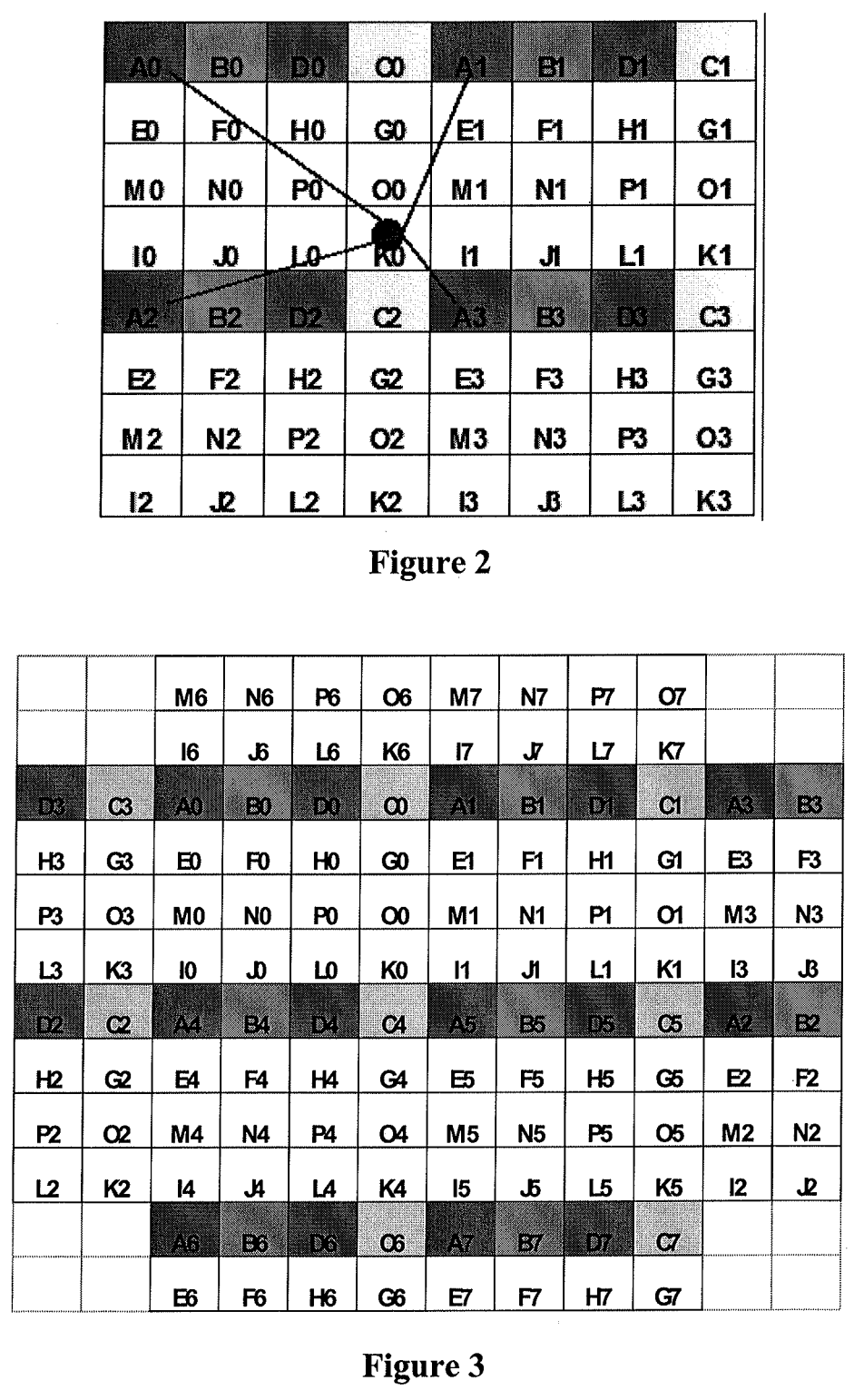

Taking 64QAM as an example, as shown in FIG. 2, symbols represented by letters A-P are determined from a part of input bit data. In FIG. 2, a position of a constellation point in a symbol subset may be determined from four bit data. Generally, the four bit data are obtained by performing a code in low density parity check code (LDPC). In FIG. 2, symbols represented by numbers 0-3 are determined by another part of bit data. It is assumed that a received symbol is a dot shown in the drawings, and decision subsets are A0, A1, A2 and A3. For conventional technology, A3 may be decided to be a final decision symbol according the least Euclidean distance criteria, and thus a corresponding bit is decided to be 11 (binary representation of 3). In this solution, the constellation points are divided into two large regions. That is, an area including numbers 0 and 1 is one large region, and the one large region is divided into two small regions including 0 and 1 respectively; and an area including numbers 2 and 3 is another large region, and the other large region is divided into two small regions including 2 and 3 respectively. In the decision, a large region where the received symbol locates is determined first, such as two quadrants corresponding to 0 and 1, as shown in the drawings. Therefore, decision subsets are further narrowed to A0 and A1. According to the least Euclidean distance, A1 is decided to be a final decision symbol, and thus a corresponding bit is decided to be 01 (binary representation of 1).

In a similar way, taking 128QAM as an example, as shown in FIG. 3, letters A-P are determined by mapping, in a predefined mapping mode, 4 bits of bit data input into a modulation mapper to corresponding constellation points of disjoint small regions; numbers 0-7 are determined by remaining 3 bit data of the bit data input into the modulation mapper. In addition, the remaining bit data may distinguish important bit data and unimportant bit data, where the important bit data is configured to divide the constellation diagram shown in FIG. 3 into 4 large regions. For example, as shown in FIG. 3, symbols with numbers 0 and 1 belong to a same large region, symbols with numbers 4 and of 5 belong to a same large region, symbols with numbers 2 and 3 belong to a same large region, and symbols with numbers 6 and 7 belong to a same large region. A subset with a same number is a divided small region. FIG. 3 is an embodiment of the 128QAM constellation diagram to be easily understood, which should not be understood as a limitation of the embodiment of the application.

Figure 4:
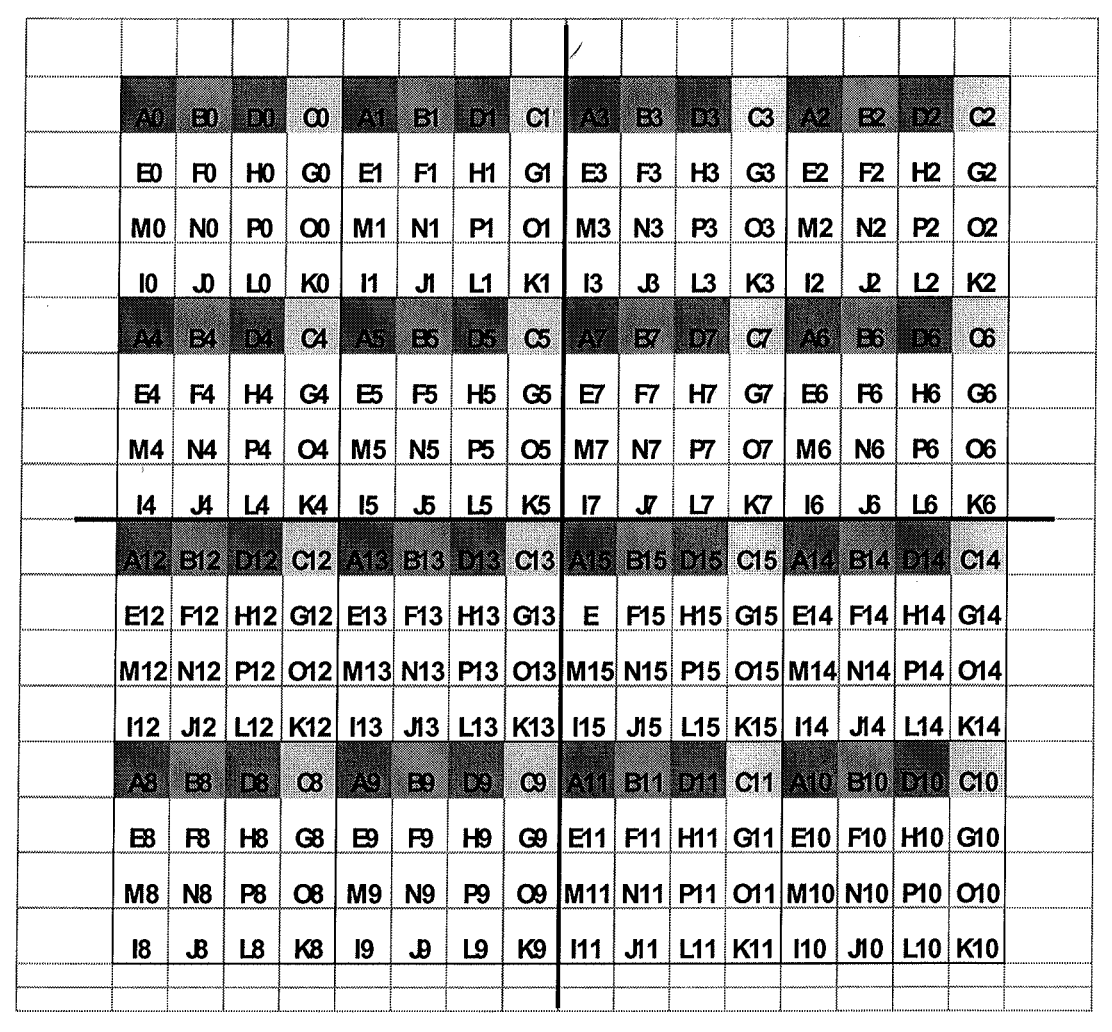

In a similar way, taking 256QAM as an example, as shown in FIG. 4, letters A-P are determined by mapping, in a predefined mapping mode, 4 bits of bit data input into a modulation mapper to corresponding constellation points of disjoint small regions; numbers 0-15 are determined by remaining bit data of the bit data input into the modulation mapper. In addition, the remaining bit data may distinguish bits in an important coset and bits in a less important conset. The important bit data divides the constellation diagram into 4 quadrants, each quadrant includes 4 sub-quadrants, and the 4 sub-quadrants are determined from unimportant bit data. Thus, the constellation diagram totally includes 16 sub-quadrants. The 16 sub-quadrants are represented by 4 bit binary numbers or 16 decimal numbers (numbers shown in the drawings). Bits for dividing four quadrants corresponds to bits in the important coset, and bits for dividing 4 sub-quadrants of each of 4 quadrants corresponds to bits in the less important coset. In this case, numbers 0, 1, 4 and 5 correspond to a quadrant; numbers 3, 2, 7 and 6 correspond to a quadrant; numbers 12, 13, 8, 9 correspond to a quadrant; and numbers 15, 14, 11 and 10 correspond to a quadrant. If the decimal numbers are converted into binary numbers, it may be found that a quadrant where a symbol locates is determined from two bits of the binary numbers, and a sub-quadrant of the quadrant, where the symbol locates, is determined from the other two bits of the binary numbers. FIG. 4 is only an embodiment of the 256QAM constellation diagram to be easily understood, which should not be understood as a limitation of the embodiment of the application.

Figure 5:
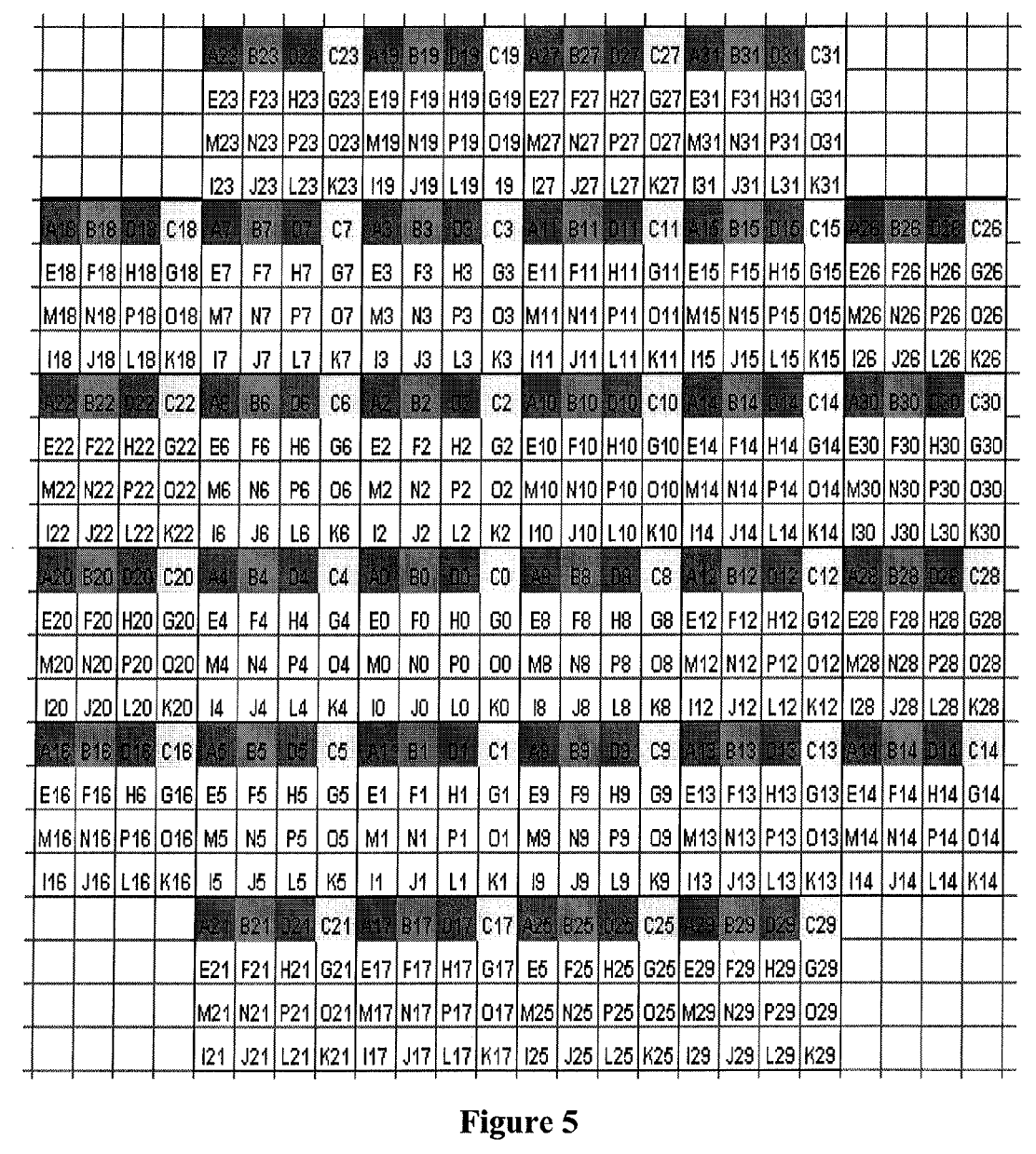

In a similar way, as shown in FIG. 5, for 512QAM, when bit data is mapped to symbol data, the bit data is divided into three parts. One part of the bit data is configured to determine positions of constellation points, i.e., A-P. One part of the bit data is configured to determine a large region. For example, 2 bits are configured to divide the constellation diagram into 4 disjoint large regions. For example, one large region is a quadrant corresponds to 23, 19, 18, 7, 3, 22, 6 and 2, and another three quadrants may be easily acquired referring to FIG. 5. The last part of the bit data, such as 3 bits, is configured to divide each large region into disjoint small regions, such as 0-32 small regions.

In a similar way, taking 1024QAM as an example, as shown in FIG. 6, when bit data is mapped to symbol data, the bit data is divided into three parts. One part of the bit data is configured to determine positions of constellation points, i.e., A-P (due to a limited display picture, not shown in FIG. 6). Letters A-P are determined by mapping, in a predefined mapping mode, 4 bits of bit data input into a modulation mapper to corresponding constellation points of disjoint small regions. Numbers 0-63 are determined by remaining bit data of the bit data input into the modulation mapper. In addition, the remaining bit data may distinguish bits in important coset and bits in less important coset. The important bit data divides the constellation diagram into 4 quadrants, and each quadrant includes 16 sub-quadrants determined from unimportant bit data. Thus, the constellation diagram totally includes 64 sub-quadrants. The 64 sub-quadrants are represented by 6 bit binary numbers or 64 decimal numbers (i.e. numbers shown in the drawing, it should be understood that the smallest unit shown in the drawing is a small region, constellation points in the small region are not shown, and the constellation points in each small region are shown in FIG. 7, where i represents a number in a range of 0-63). Four quadrants are divided according to the bits in the important coset, and 16 sub-quadrants of each of the 4 quadrants are divided according to the bits in the less important coset. In this case, 0, 8, 24, 16, 1, 9, 25, 17, 3, 11, 27, 19, 2, 10, 26 and 18 correspond to a quadrant; 6, 7, 5, 4, 14, 15, 13, 12, 30, 31, 29, 28, 22, 23, 21, and 20 correspond to a quadrant; 48, 49, 51, 50, 56, 57, 59, 58, 40, 41, 43, 42, 32, 33, 35 and 34 correspond to a quadrant; and 54, 55, 53, 52, 62, 63, 61, 60, 46, 47, 45, 44, 38, 39, 37 and 36 correspond to a quadrant. If the decimal numbers are converted into binary numbers, it may be found that a quadrant where a symbol locates is determined from two bits of the binary numbers, and a sub-quadrant of the quadrant, where the symbol locates, is determined from another four bits of the binary number. FIG. 6 is only an embodiment of the 1024QAM constellation diagram to be easily understood, which should not be understood as a limitation of the embodiment of the application.

In a similar way, taking 2048QAM as an example, as shown in FIG. 8, when bit data is mapped to symbol data, the bit data is divided into three parts. One part of the bit data is configured to determine positions of constellation points, i.e., A-P (due to a limited display picture, not shown in FIG. 8). Letters A-P are determined by mapping, in a predefined mapping mode, 4 bits of the bit data input into a modulation mapper to corresponding constellation points of disjoint small regions. Numbers 0-127 are determined by remaining bit data of the bit data input into the modulation mapper. In addition, the remaining bit data may distinguish bits in the important coset and bits in the less important coset. The important bit data divides the constellation diagram into 4 quadrants, and each quadrant includes 32 sub-quadrants determined from unimportant bit data. Thus, the constellation diagram totally includes 128 sub-quadrants. The 128 sub-quadrants are represented by 7 bit binary numbers or 128 decimal numbers (i.e. numbers shown in the drawing, it should be understood that the smallest unit shown in the drawing is a small region, constellation points in the small region are not shown, and the constellation points in each small region are shown in FIG. 7, where i represents a number in a range of 0-127). Four quadrants are divided according to the bits in the important coset, and 32 sub-quadrants of each of the 4 quadrants are divided according to the bits in the less important coset. In this case, 117, 116, 113, 115, 121, 120, 112, 114, 118, 119, 125, 124, 122, 123, 127, 126, 58, 59, 63, 62, 56, 57, 61, 60, 48, 49, 53, 52, 50, 51, 55 and 54 correspond to a quadrant; 83, 81, 84, 85, 82, 80, 88, 89, 18, 19, 23, 22, 16, 17, 21, 20, 24, 25, 29, 28, 26, 27, 31, 30, 90, 91, 95, 94, 86, 87, 93 and 92 correspond to a quadrant; 102, 103, 109, 108, 110, 111, 107, 106, 46, 47, 43, 42, 105, 101, 100, 104, 40, 41, 45, 44, 36, 37, 33, 32, 96, 97, 38, 39, 35, 34, 98 and 99 correspond to a quadrant; and 6, 7, 3, 2, 4, 5, 1, 0, 12, 13, 9, 8, 14, 15, 11, 10, 66, 67, 64, 65, 72, 68, 73, 69, 78, 79, 75, 74, 76, 77, 71 and 70 correspond to a quadrant. If the decimal numbers are converted into binary numbers, it may be found that a quadrant where a symbol locates is determined from two bits of the binary numbers, and a sub-quadrant of the quadrant, where the symbol locates, is determined from another five bits of the binary numbers. FIG. 8 is only an embodiment of the 2048QAM constellation diagram to be easily understood, which should not be understood as a limitation of the embodiment of the application.

In a similar way, taking 4096QAM as an example, as shown in FIG. 9, when bit data is mapped to symbol data, the bit data is divided into three parts. One part of the bit data is configured to determine positions of constellation points, i.e., A-P (due to a limited display picture, not shown in FIG. 9). Letters A-P are determined by mapping, in a predefined mapping mode, 4 bits of the bit data input into a modulation mapper to corresponding constellation points of disjoint small regions. Numbers 0-255 are determined by remaining bit data of the bit data input into the modulation mapper. In addition, the remaining bit data may distinguish bits in the important coset and bits in the less important coset. The important bit data divides the constellation diagram into 4 quadrants (specifically the small regions shown in FIG. 9 may be uniformly divided into four parts, each part may be understood as a quadrant), each quadrant includes 64 sub-quadrants, and the sub-quadrant may be determined from unimportant bit data. Thus, the constellation diagram totally includes 256 sub-quadrants. The 256 sub-quadrants are represented by 8 bit binary numbers or 256 decimal numbers (i.e. numbers shown in the drawing, it should be understood that the smallest unit shown in the drawing is a small region, constellation points in the small region are not shown, and the constellation points in each small region are shown in FIG. 7, where i represents a number in a range of 0-255). 4 quadrants are divided according to the bits in the important coset, and 64 sub-quadrants of each of the 4 quadrants are divided according to the bits in the less important coset. If the decimal numbers are converted into binary numbers, it may be found that a quadrant where a symbol locates is determined from two bits of the binary numbers, and a sub-quadrant of the quadrant, where the symbol locates, is determined from another six bits of the binary numbers. FIG. 9 is only an embodiment of the 4096QAM constellation diagram to be easily understood, which should not be understood as a limitation of the embodiment of the application.

For higher order QAM, when bit data is mapped to symbol data, the bit data is divided into three parts. One part of the bit data is mapped to corresponding constellation points (such as letters A-P) of disjoint small regions according to a predefined mapping mode. One part of the bit data is configured to divide the mapped constellation points into disjoint large region (for example, a foregoing quadrant corresponding to 12, 13, 8 and 9 forms a large region). The last part of bit data is configured to divide subsets of the constellation points of each large region into disjoint small regions (such as number 0 and 1, etc). A mapping process of a higher order QAM is not described in detail in the embodiment, which may be easily derived based on the mapping schemes currently described.

In addition, it is noted that, letters and numbers described according to the embodiment are examples for understanding the embodiment of the application, which will not limit the embodiment of the application. The numbers and letters may be different according to a practical design.

A high order modulation method is provided according to the embodiment of the application. The method differs from the conventional technology in that important bits are distinguished according to difficult degrees of decision areas, which is divided into important bits for dividing large regions and important bits for dividing small regions. Therefore, decision accuracy of a demodulator is further improved.

Embodiment 2

Figure 10:
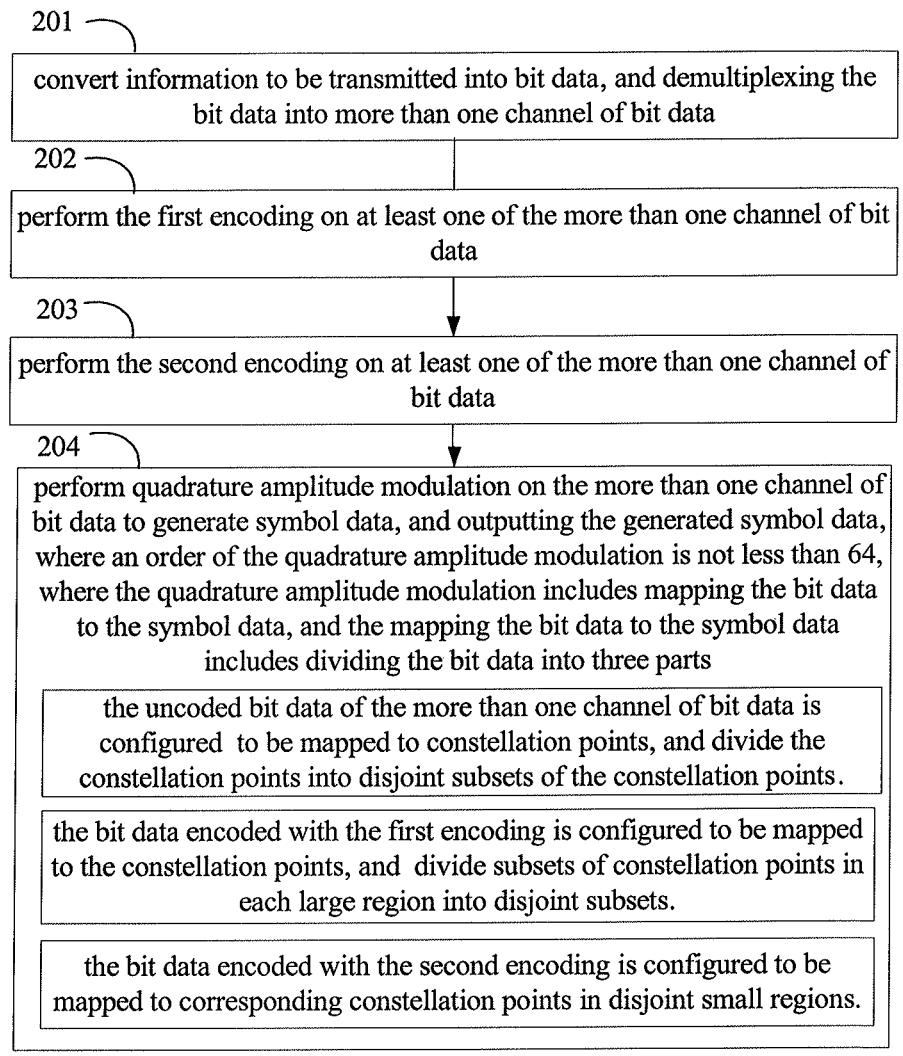
FIG. 10 is a schematic flow chart of a high order modulation method according to a second embodiment of the application.

A high order modulation method is provided according to an embodiment of the application, as shown in FIG. 10. In the case that input bit data includes: bit data encoded with first encoding, bit data encoded with second encoding, and uncoded bit data, the method includes following steps.

Step 201 includes: converting information to be transmitted into bit data, and demultiplexing the bit data into more than one channel of bit data.

Step 202 includes: performing the first encoding on at least one of the more than one channel of bit data.

Step 203 includes: performing the second encoding on at least one of the more than one channel of bit data.

Step 204 includes: performing quadrature amplitude modulation on the more than one channel of bit data to generate symbol data, and outputting the generated symbol data.

An order of the quadrature amplitude modulation is not less than 64. The quadrature amplitude modulation includes mapping the bit data to the symbol data, and the mapping the bit data to the symbol data includes dividing the bit data into three parts.

The uncoded bit data of the more than one channel of bit data is configured to be mapped to constellation points, and divide the constellation points into disjoint subsets of the constellation points.

The bit data encoded with the first encoding is configured to be mapped to constellation points, and divide subsets of constellation points in each large region into disjoint subsets.

The bit data encoded with the second encoding is mapped to corresponding constellation points in disjoint small regions.

Alternatively, in step 204, the bit data encoded with first encoding is replaced with the uncoded bit data in a function of the mapping. That is, the input bit data encoded with first encoding is configured to divide mapped constellation points into disjoint subsets of constellation points (i.e., mapped to large regions); and the uncoded bit data is configured to be mapped to smaller disjoint subsets of constellation points (i.e., mapped to small regions) in the subsets of constellation points of the uncoded bit data.

To understand better, in step 204, the first encoding is cyclic code, which may at least include any one of RS (Reed-solomon) code or BCH (Bose-Chaudhuri-Hocquengham) code; the second encoding may specifically include any one of low density parity check code, convolutional code, Polar code, Turbo code, generalized cascade code and product code.

Figures 11, 12:
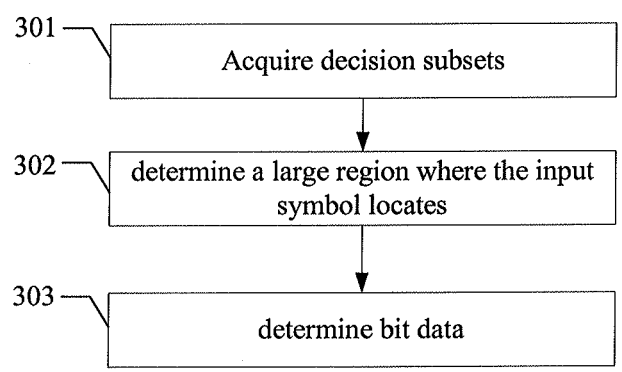
FIG. 11 is a schematic diagram of a 64QAM constellation mapping according to an embodiment of the application.
FIG. 12 is a schematic flow chart of a demapping method according to an third embodiment of the application.

As shown in FIG. 11, in a 64QAM modulation mode, each modulation symbol may include 4 bits from a coded bit stream passing through a LDPC channel encoder, and 2 bits from a uncoded bit stream or a bit stream passing through a BCH/RScode encoder. One of the 2 bits is configured to divide mapped constellation points into disjoint large regions, and the other bit is configured to divide the large region into smaller disjoint subsets of constellation points (i.e., small regions). Each constellation point in the diagram is represented by a combination of a symbol and a number, where the symbol represents bits corresponding to the coded bit stream, and the number represent bits corresponding to the uncoded bit stream.

In a similar way, in a 128QAM modulation mode, referring to FIG. 3, each modulation symbol may include 4 bits from a coded bit stream passing through a LDPC channel encoder, and 3 bits from a uncoded bit stream or a bit stream passing through a BCH/RS code encoder. 2 bits of the 3 bits are configured to divide mapped constellation points into disjoint large regions, and the remaining bit is configured to divide the large region into smaller disjoint subsets of constellation points (i.e., small regions). Each constellation point in the diagram is represented by a combination of a symbol and a number, where the symbol represents bits corresponding to the coded bit stream, and the number represents bits corresponding to the uncoded bit stream.

In a similar way, in a 256 QAM modulation mode, referring to FIG. 4, each modulation symbol may include 4 bits from a coded bit stream passing through a LDPC channel encoder, and 4 bits from a uncoded bit stream or a bit stream passing through a BCH/RS code encoder. 2 bits of the 4 bits are configured to divide mapped constellation points into disjoint large regions, and the remaining 2 bits are configured to divide the large region into smaller disjoint subsets of constellation points (i.e., small regions). Each constellation point in the diagram is represented by a combination of a symbol and a number, where the symbol represents bits corresponding to the coded bit stream, and the number represents bits corresponding to the uncoded bit stream.

In a similar way, in a 512 QAM modulation mode, referring to FIG. 5, each modulation symbol may include 4 bits from a coded bit stream passing through a LDPC channel encoder, and 5 bits from a uncoded bit stream or a bit stream passing through a BCH/RS code encoder. 2 bits of the 5 bits are configured to divide mapped constellation points into disjoint large regions, and the remaining 3 bits are configured to divide the large region into smaller disjoint subsets of constellation points (i.e., small regions). Each constellation point in the diagram is represented by a combination of a symbol and a number, where the symbol represents bits corresponding to the coded bit stream, and the number represent bits corresponding to the uncoded bit stream.

In a 1024QAM modulation mode, each modulation symbol includes 4 bits from a coded bit stream passing through a LDPC channel encoder, and 6 bits from a uncoded information bit stream or a bit stream passing through a BCH/RS code encoder. 3 bits of the 6 bits may be configured to divide mapped constellation points into disjoint large regions, and the 3 remaining bits may be configured to divide the large regions into smaller disjoint subsets of constellation points (i.e., small regions).

In a 2048QAM modulation mode, each modulation symbol includes 4 bits from a coded bit stream passing through a LDPC channel encoder, and 7 bits from a uncoded information bit stream or a bit stream passing through a BCH/RS code encoder. 2 bits of the 7 bits may be configured to divide mapped constellation points into disjoint large regions, and the 5 remaining bits may be configured to divide the large region into smaller disjoint subsets of constellation points (i.e., small regions).

In a 4096QAM modulation mode, each modulation symbol includes 4 bits from a coded bit stream passing through a LDPC channel encoder, and 8 bits from a uncoded information bit stream or a bit stream passing through a BCH/RS code encoder. 2 bits of the 8 bits may be configured to divide mapped constellation points into disjoint large regions, and the 6 remaining bits may be configured to divide the large region into smaller subsets of constellation points (i.e., small regions).

A high order modulation method is provided according to the embodiment of the application. In the method, important bits are distinguished, which is divided into important bits for dividing large regions and important bits for dividing small regions. Therefore, decision accuracy of a demodulator is further improved.

Embodiment 3

A demapping method is provided according to an embodiment of the application. As shown in FIG. 12, the method includes following steps.

Step 301 includes: performing a demodulation decision on an input symbol, and acquiring decision subsets.

Step 302 includes: determining a large region where the input symbol locates, where the region divides constellation points into disjoint subsets of constellation points.

Step 303 includes: determining bit data mapped by the input symbol, according to minimum distance demodulation criterion, acquired decision subsets and the determined region where the input symbol locates.

The minimum distance demodulation criterion described in step 303 is that in the decision area, the constellation point, closest to the received symbol in Euclidean distance, is the final decision symbol. That is, in the large region where the input symbol locates, a constellation point in the decision subset, closest to the input symbol in Euclidean distance, is determined to be a decision symbol of the input symbol, and the decision symbol is mapped to the bit data.

Referring to the first embodiment, as shown in FIG. 2, for 64QAM, it is assumed that a received symbol is a dot shown in the diagram, and decision subsets are A0, A1, A2 and A3. When a decision is performed, a region where the received symbol locates is determined first. As shown in the drawing, the region includes two quadrants corresponding to 0 and 1. Therefore, decision subsets are narrowed to A0 and A1. According to the least Euclidean distance criteria, A1 is decided to be the final decision symbol, and thus bits corresponding to A1 are decided to be 01 (binary representation of 1).

A demapping method is provided according to the embodiment of the application, important bits are distinguished, according to difficult degrees of decision areas, which is divided into important bits for dividing large regions and important bits for dividing small regions. Therefore, compared with conventional technology, the demapping method may further improve decision accuracy of a demodulator.

Embodiment 4

Figure 13A:
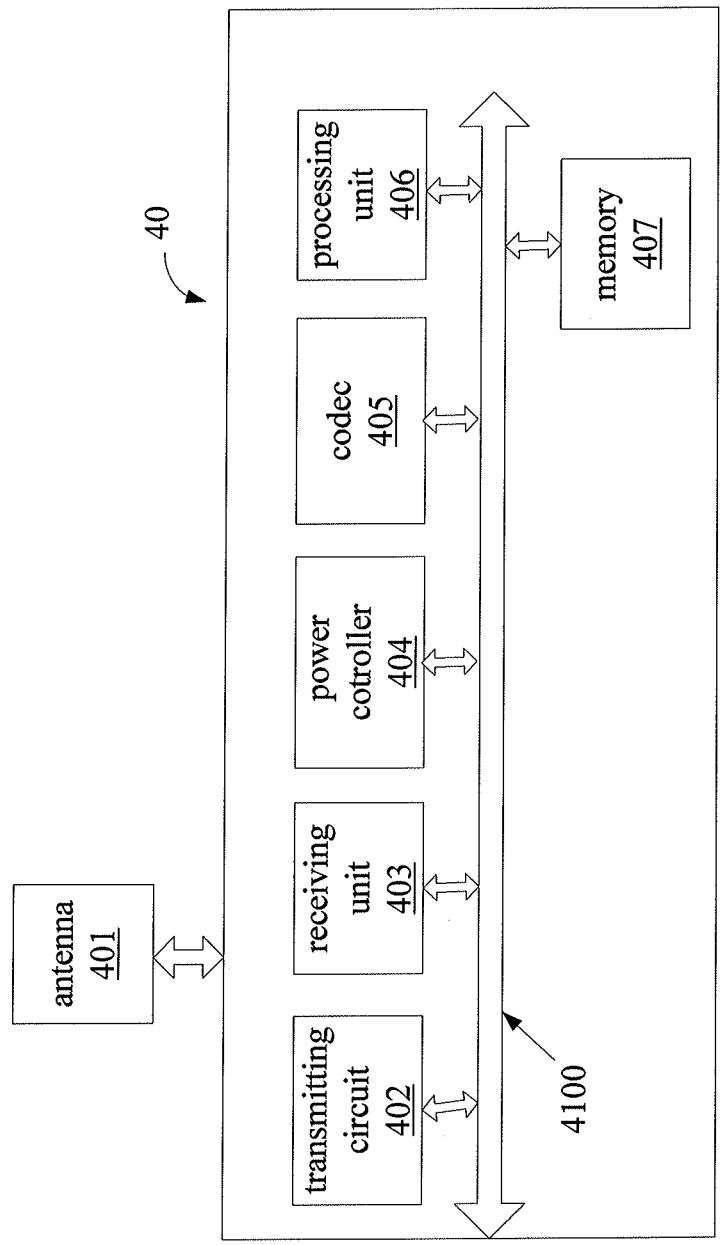
FIG. 13a is a schematic diagram of a high order modulation device according to an fourth embodiment of the application.

An embodiment of a device, configured to implement the steps and the method according to the above method embodiment, is further provided according to an embodiment of the application. The embodiment of the application may be applied to a base station or a terminal in various communication systems. An embodiment of a user device is shown in FIG. 13a. According to the embodiment, the device 40 includes a transmitting circuit 402, a receiving unit 403, a power controller 406, a codec 405, a processing unit 406, a memory 407 and an antenna 401. The processing unit 406 controls an operation of the device 40, which may be called CPU. The memory 407 may include a read-only memory and a random access memory, which is configured to provide instructions and data to the processing unit 406. A part of the memory 407 may include a non-volatile random access memory (NVRAM). In a specific application, the device 40 may be embedded into or may be a wireless communication device such as a mobile phone, etc. The device 40 may also include a carrier for accommodating the transmitting circuit 402 and the receiving circuit 403, by which data transmission and reception may be performed between the device 40 and a device at a remote position. The transmitting circuit 402 and the receiving circuit 403 may be coupled to the antenna 401. All components of the device 40 are coupled together through a bus system 4100. Besides a data bus, the bus system 4100 also includes a power bus, a control bus and a status signal bus. For clear description, all kinds of buses in the drawing are marked as the bus system 4100. The device 40 may also include the processing unit 406 configured to process signals, and also includes a power controller 404 and the codec 405.

The method disclosed according to the embodiment of the application may be applied to the codec 405 or may be implemented by the codec 405. The codec 405 may be an integrated circuit chip having a function of signal processing. In an implementation process, each step of the method may be completed through an integrated logic circuit of hardware in the codec 405 or software instructions of the codec 405. The instructions may be implemented and controlled in cooperation with a processor 406. The codec, configured to execute the method disclosed according to the embodiment of the application, may be a general processor, a digital signal processor (DSP), an application specific integrated circuit (ASIC), field programmable gate array (FPGA) or other programmable logic devices, discrete gates or transistor logic devices, and a discrete hardware component, which may implement or execute the methods, steps and logic block diagrams according to the embodiment of the application. The general processor may be a microprocessor, any conventional processor or any conventional encoder, etc.

Steps of the method disclosed according to the embodiment of the application may be directly reflected as being executed by hardware of the codec or by a combination of hardware and software modules in the codec. The software module may be located at a storage medium with a refined technology in the art, such as a random access memory, a flash memory, a read-only memory, a programmable read-only memory or an electrically erasable programmable memory and a register, etc. The storage medium is located at the memory 407, and a decoding unit reads information in the memory 407 and completes the steps of the method in cooperation with the hardware of the codec.

Figure 13B:
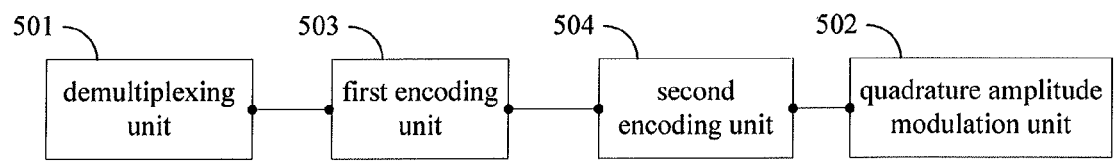
FIG. 13b is schematic diagram of another high order modulation device according to the fourth embodiment of the application.

A high order modulation device is provided according to an embodiment of the application. As shown in FIG. 13b, the device includes a demultiplexing unit 501 and a quadrature amplitude modulation unit 502, where the de-multiplexing unit 501 and the quadrature amplitude modulation unit 502 may be a part of the codec 405.

The de-multiplexing unit 501 is configured to convert information to be transmitted into bit data, and demultiplex the bit data into more than one channel of bit data.

The quadrature amplitude modulation unit 502 is configured to perform quadrature amplitude modulation on the more than one channel of bit data to generate symbol data, and output the generated symbol data.

An order of the quadrature amplitude modulation is not less than 64. The quadrature amplitude modulation includes mapping the bit data to the symbol data, and the mapping the bit data to the symbol data includes dividing the bit data into three parts.

The first part of the bit data is configured to be mapped to constellation points and divide the constellation points into disjoint subsets of constellation points, and the subsets are defined as large called regions.

The second part of the bit data is configured to be mapped to the constellation points and divide subsets of constellation points in each large region into disjoint subsets, and the disjoint subsets in each large region are defined as small regions.

The third part of the bit data is configured to be mapped to corresponding constellation points in the small regions.

A high order modulation device is provided according to the embodiment of the application. Important bits are distinguished, which is divided into important bits for dividing large regions and important bits for dividing small regions according to difficult degrees of decision areas. Therefore, decision accuracy of a demodulator is further improved.

In addition, the device further includes: a first encoding unit 503 and a second encoding unit 504. The first encoding unit 503 and the second encoding unit 504 may be a part of the codec 405.

The first encoding unit 503 is configured to perform a first encoding on at least one of the more than one channel of bit data.

The second encoding unit 504 is configured to perform a second encoding on at least one of the more than one channel of bit data.

The quadrature amplitude modulation unit 502 is specifically configured to perform quadrature amplitude modulation on the more than one channel of bit data to generate symbol data, and output the generated symbol data.

An order of the quadrature amplitude modulation is not less than 64. The quadrature amplitude modulation includes mapping the bit data to the symbol data, and the mapping the bit data to the symbol data includes dividing the bit data into three parts.

The uncoded bit data of the more than one channel of bit data is configured to be mapped to constellation points, and divide the constellation points into disjoint subsets of the constellation points.

The bit data encoded with the first encoding is configured to be mapped to constellation points, and divide subsets of constellation points in each large region into disjoint subsets.

The bit data encoded with the second encoding is configured to be mapped to corresponding constellation points in disjoint small regions.

The first encoding includes any one of RS code, BCH code or cyclic code,

The second encoding includes any one of low density parity check code, convolutional code, Polar code, Turbo code, generalized cascade code and product code.

Embodiment 5

Figure 14:
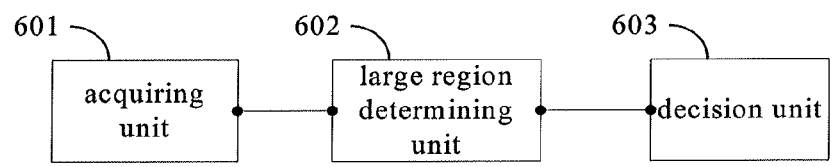
FIG. 14 is a schematic diagram of a demapping device according to a fifth embodiment of the application.

A demapping device is provided according to an embodiment of the application. As shown in FIG. 14, the device includes: an acquiring unit 601, a large region determining unit 602 and a decision unit 603, where the acquiring unit 601, the large region determining unit 602 and the decision unit 603 may be a part of the codec 405.

The acquiring unit is configured to perform demodulation decision on an input symbol, and acquire decision subsets.

The large region determining unit is configured to determine a large region where the input symbol locates, where the large region divides constellation points into disjoint subsets of constellation points.

The decision unit is configured to determine bit data mapped by the input symbols, according to minimum distance demodulation criterion, the acquired decision subsets and the determined large region where the input symbol locates.

Preferably, the decision unit is further configured to determine, from the large region where the input symbol locates, that a constellation point in the decision subset, closest to the input symbol in Euclidean distance, is a decision symbol of the input symbol; and map the decision symbol to the bit data.

A demapping device is provided according to the embodiment of the application, important bits are distinguished into important bits for dividing large regions and important bits for dividing small regions according to difficult degrees of decision areas. Therefore, compared with conventional technology, this demapping method may further improve decision accuracy of a demodulator.

It is should be understood that details of the device described according to the fourth embodiment and the fifth embodiment may refer to corresponding method claim 1 to claim 3, which will be omitted herein.

It may be understood for persons of ordinary skill in the art that few or all steps of implementing the embodiments may be completed through instructing a relevant hardware by a program, the program may be stored in a computer readable storage medium, which may be an access memory, a magnetic disk or a compact disk, FPGA (field programmable gate array), a DSP (digital signal processor) and a CPU (central processing unit).

The foregoing is detail description of a high order modulation method, a demapping method and a corresponding device, for persons with skill in the art, based on the spirit of the embodiments of the application, some alternations may be made on embodiments and application scope, in conclusion, content of the application should not be understood as a limitation of the application.

The invention claimed is:

1. A high order modulation method, comprising:
converting information to be transmitted into bit data, and demultiplexing the bit data into more than one channel of bit data; and
performing quadrature amplitude modulation on the more than one channel of bit data to generate symbol data, and outputting the generated symbol data,
wherein an order of the quadrature amplitude modulation is not less than 64, and the quadrature amplitude modulation comprising mapping the bit data to the symbol data, and the mapping the bit data to the symbol data comprising dividing the bit data into three parts, wherein
a first part of the bit data is configured to be mapped to constellation points and divide the constellation points into disjoint subsets of constellation points, and the subsets are defined as large regions;
a second part of the bit data is configured to be mapped to the constellation points and divide subsets of the constellation points in each large region into disjoint subsets, and the disjoint subsets in each large region are defined as small regions; and
a third part of the bit data is configured to be mapped to corresponding constellation points in the small regions.

2. The method according to claim 1, wherein after the demultiplexing the bit data into more than one channel of the bit data, and before the performing quadrature amplitude modulation on the more than one channel of bit data, the method further comprises:
performing a first encoding on at least one of the more than one channel of bit data; and
performing a second encoding on at least one of the more than one channel of bit data,
wherein the first part of bit data is configured to be mapped to constellation points and divide the constellation points into disjoint subsets of constellation points further comprises:
uncoded bit data in the more than one channel of bit data being mapped to constellation points and divide the constellation points into disjoint subsets of the constellation points;
the second part of the bit data is configured to be mapped to the constellation points and divide subsets of the constellation points in each large region into disjoint subsets further comprises:
the bit data encoded with the first encoding being mapped to the constellation points, and divide subsets of constellation points in each large region into disjoint subsets; and
the third part of the bit data is configured to be mapped to corresponding constellation points in the small regions further comprises:
the bit data encoded with the second encoding being mapped to corresponding constellation points in the disjoint small regions.

3. The method according to claim 2, wherein the first encoding is cyclic code, and the cyclic code at least comprises any one of Reed-solomon (RS) code or Bose-Chaudhuri-Hocquengham (BCH) code; and
the second encoding comprises any one of low density parity check code, convolutional code, Polar code, Turbo code, generalized cascade code and product code.

4. A demapping method, comprising:
performing a demodulation decision on an input symbol, and acquiring decision subsets;
determining a large region where the input symbol locates, and the large region divides constellation points into disjoint subsets of constellation points; and
after acquiring decision subsets, determining bit data mapped by the input symbol, according to minimum distance demodulation criterion, acquired decision subsets and the determined large region where the input symbol locates.

5. The method according to claim 4, wherein
the determining bit data mapped by the input symbol, according to minimum distance demodulation criterion, acquired decision subsets and the determined large regions where the input symbols locate further comprises:
determining, from the region where the input symbol locates, that a constellation point in a decision subset, closest to the input symbol in Euclidean distance, is a decision symbol of the input symbol; and mapping the decision symbol to the bit data.

6. A high order modulation device, comprising a demultiplexing unit and a quadrature amplitude modulation unit, wherein
the demultiplexing unit is configured to convert information to be transmitted into bit data, and demultiplex the bit data into more than one channel of bit data;

the quadrature amplitude modulation unit is configured to perform quadrature amplitude modulation on the more than one channel of bit data to generate symbol data, and output the generated symbol data, wherein an order of the quadrature amplitude modulation is not less than 64 and wherein the quadrature amplitude modulation comprising mapping the bit data to the symbol data, and the mapping the bit data to the symbol data comprising dividing the bit data into three parts, wherein a first part of bit data is configured to be mapped to constellation points and divide the constellation points into disjoint subsets of constellation points, and the subsets are defined as large regions, a second part of the bit data is configured to be mapped to the constellation points and divide subsets of the constellation points in each large region into disjoint subsets, and the disjoint subsets in each large region are defined as small regions, and a third part of the bit data is configured to be mapped to corresponding constellation points in the small regions.

7. The device according to claim 6, further comprising: a first encoding unit and a second encoding unit, wherein the first encoding unit is configured to perform a first encoding on at least one of the more than one channel of bit data, and the second encoding unit is configured to perform a second encoding on at least one of the more than one channel of bit data, the quadrature amplitude modulation unit is further configured to perform quadrature amplitude modulation on the more than one channel of bit data to generate symbol data, and output the generated symbol data, wherein an order of the quadrature amplitude modulation is not less than 64 and wherein the quadrature amplitude modulation comprising mapping the bit data to the symbol data, and the mapping the bit data to the symbol data comprising dividing the bit data into three parts;

uncoded bit data in the more than one channel of bit data is configured be mapped to constellation points, and divide the constellation points into disjoint subsets of constellation points;

the bit data encoded with the first encoding is configured to be mapped to the constellation points, and divide subsets of constellation points in each large region into disjoint subsets; and the bit data encoded with the second encoding is configured to be mapped to corresponding constellation points in disjoint small regions.

8. The device according to claim 7, wherein the first encoding is cyclic code, the cyclic code comprises at least any one of Reed-solomon (RS) code or Bose-Chaudhuri-Hocquenghamt (BCH) code; and the second encoding comprises any one of low density parity check code, convolutional code, Polar code, Turbo code, generalized cascade code and product code.

9. A demapping device, comprising an acquiring unit, a large region determining unit and a decision unit, wherein the acquiring unit is configured to perform demodulation decision on an input symbol, and acquire decision subsets;

the large region determining unit is configured to determine a region where the input symbol locates, wherein the region divides constellation points into disjoint subsets of constellation points; and the decision unit is configured to determine bit data mapped by the input symbols, according to minimum distance demodulation criterion, acquired decision subsets and the determined large regions where the input symbol locates.

10. The method according to claim 9, wherein the decision unit is further configured to determine, from the large regions where the input symbol locates, that a constellation point in a decision subset, closest to the input symbol in Euclidean distance, is a decision symbol of the input symbol; and map the decision symbol to the bit data.

* * * * *